United States Patent
Mircea et al.

(10) Patent No.: US 12,118,043 B2
(45) Date of Patent: Oct. 15, 2024

(54) ROBOTIC PROCESS AUTOMATION (RPA) COMPRISING AUTOMATIC DOCUMENT SCROLLING

(71) Applicant: UiPath Inc., New York, NY (US)

(72) Inventors: Iulian Mircea, Bucharest (RO); Lev Kushnir, Vienna (AT)

(73) Assignee: UiPath Inc., New York, NY (US)

( * ) Notice: Subject to any disclaimer, the term of this patent is extended or adjusted under 35 U.S.C. 154(b) by 809 days.

(21) Appl. No.: 17/302,560

(22) Filed: May 6, 2021

(65) Prior Publication Data
US 2022/0355473 A1    Nov. 10, 2022

(51) Int. Cl.
*G06F 9/451* (2018.01)
*G05B 19/042* (2006.01)
(Continued)

(52) U.S. Cl.
CPC ......... *G06F 16/93* (2019.01); *G05B 19/0426* (2013.01); *G06F 9/451* (2018.02);
(Continued)

(58) Field of Classification Search
CPC .......... G06F 16/93; G06F 9/451; G06F 11/36; G06F 11/3696; G06F 40/174; G06F 9/45512; G06F 9/45529; G06F 8/34; G06F 3/0483; G06F 3/0485; G06F 9/455; G05B 19/0426; G05B 2219/23258; G05B 2219/24071; B25J 9/1628
See application file for complete search history.

(56) References Cited

U.S. PATENT DOCUMENTS 5,600,789 A * 2/1997 Parker ............... G06K 13/0825
                                                     714/38.11
5,874,961 A    2/1999 Bates et al.
(Continued)

FOREIGN PATENT DOCUMENTS

WO    2019172485 A    9/2019
WO    2021130500 A    7/2021

OTHER PUBLICATIONS

European Patent Office (EPO), Extended European Search Report Mailed Jun. 8, 2022 for EPO Application No. 21218270.3, regional stage of PCT International Application No. PCT/US2021/072627, international filing date Nov. 30, 2021, priority date May 6, 2021.
(Continued)

*Primary Examiner* — Sanchita Roy
(74) *Attorney, Agent, or Firm* — Law Office of Andrei D Popovici, PC

(57) ABSTRACT

In some embodiments, a robotic process automation (RPA) robot is configured to search for a target element within a first part of a document currently exposed within a user interface. When the search fails, the robot may automatically actuate a scroll control of the respective UI to cause it to bring another part of the respective document into view. The robot may then continue searching for the RPA target within the newly revealed part of the document. In some embodiments, the robot automatically determines whether the respective document is scrollable, and identifies the scroll control according to a type of target application (e.g., spreadsheet vs. web browser).

21 Claims, 12 Drawing Sheets

(51) Int. Cl.
*G06F 11/36* (2006.01)
*G06F 16/93* (2019.01)
*B25J 9/16* (2006.01)

(52) U.S. Cl.
CPC .......... *G06F 11/36* (2013.01); *G06F 11/3696* (2013.01); *B25J 9/1628* (2013.01); *G05B 2219/23258* (2013.01); *G05B 2219/24071* (2013.01)

(56) References Cited

U.S. PATENT DOCUMENTS

| | | | |
|---|---|---|---|
| 10,235,192 | B2 | 3/2019 | Hall et al. |
| 10,354,225 | B2 | 7/2019 | Sharma et al. |
| 10,713,068 | B1 | 7/2020 | Zohar et al. |
| 10,949,225 | B2 | 3/2021 | Fernandes et al. |
| 2010/0058226 | A1 | 3/2010 | Flake et al. |
| 2013/0263090 | A1* | 10/2013 | Polk .................. A63F 13/60 717/124 |
| 2015/0339213 | A1* | 11/2015 | Lee ..................... G06F 3/0484 717/125 |
| 2018/0173614 | A1* | 6/2018 | Gong ................. G06F 11/3664 |
| 2019/0324781 | A1 | 10/2019 | Ramamurthy et al. |
| 2019/0354720 | A1 | 11/2019 | Tucker et al. |
| 2020/0034399 | A1 | 1/2020 | Beno et al. |
| 2020/0073686 | A1 | 3/2020 | Hanke et al. |
| 2020/0285353 | A1 | 9/2020 | Rezazadeh Sereshkeh et al. |
| 2021/0110233 | A1 | 4/2021 | Voicu et al. |

OTHER PUBLICATIONS

Korean Patent Office, International Search Report Mailed Mar. 21, 2022 for PCT International Application No. PCT/US2021/072627, international filing date Nov. 30, 2021, priority date May 6, 2021.
Korean Patent Office, Written Opinion Mailed Mar. 21, 2022 for PCT International Application No. PCT/US2021/072627, international filing date Nov. 30, 2021, priority date May 6, 2021.

* cited by examiner

ROBOTIC PROCESS AUTOMATION (RPA) COMPRISING AUTOMATIC DOCUMENT SCROLLING

BACKGROUND

The invention relates to robotic process automation (RPA), and in particular to facilitating the automatic processing of large documents, such as substantial spreadsheets and webpages.

RPA is an emerging field of information technology aimed at improving productivity by automating repetitive computing tasks, thus freeing human operators to perform more intellectually sophisticated and/or creative activities. Notable tasks targeted for automation include extracting structured data from documents and interacting with user interfaces, for instance to fill in forms, among others. However, automating the interaction with a user interface poses substantial technical challenges, for instance unambiguously identifying a target UI element such as a button, a form field, or a spreadsheet cell. Furthermore, RPA applications may fail due to changes in the appearance of the interface (e.g., positioning of various elements, color scheme, fonts, etc.) occurring between the design of the respective software robot and runtime.

A distinct prong of RPA development is directed at simplifying the programming and management of software robots, with the ultimate goal of extending the reach of RPA technology to users that lack advanced programming skills or training. One way of making RPA more accessible is the development of RPA-oriented integrated development environments (IDEs) which allow the programming of robots via graphical user interface (GUI) tools, instead of coding per se.

In view of the above, there is a strong interest in developing robust and scalable robots capable of performing in a variety of runtime situations, while keeping the design of such robots as intuitive and user-friendly as possible, to attract a broad audience of developers.

SUMMARY

According to one aspect, a method comprises employing at least one hardware processor of a computer system, in response to receiving a robotic process automation (RPA) script indicating a target element of a user interface (UI), to perform an attempt to identify a runtime instance of the target element within a runtime instance of the UI, the runtime instance of the UI currently displaying an initial part of an electronic document. The method further comprises, if the attempt fails, employing the at least one hardware processor to determine whether a UI container currently displaying the initial part of the electronic document is scrollable and in response, if the UI container is scrollable, to activate a scroll control to cause the runtime instance of the UI to display a subsequent part of the electronic document. The method further comprises, in response to activating the scroll control, performing another attempt to identify the runtime instance of the target element within the runtime instance of the UI, the runtime instance of the UI currently displaying the subsequent part of the electronic document. The method further comprises, in response to a successful identification of the runtime instance of the target element, employing the at least one hardware processor to perform an action that reproduces a result of a human operator acting on the runtime instance of the target element.

According to another aspect, a computer system comprises at least one hardware processor configured, in response to receiving an RPA script indicating a target element of a UI, to perform an attempt to identify a runtime instance of the target element within a runtime instance of the the runtime instance of the UI currently displaying an initial part of an electronic document. The at least one hardware processor is further configured, if the first attempt fails, to determine whether a UI container currently displaying the initial part of the electronic document is scrollable, and in response, if the UI container is scrollable, to activate a scroll control to cause the runtime instance of the UI to display a subsequent part of the electronic document. The at least one hardware processor is further configured, in response to activating the scroll control, to perform another attempt to identify the runtime instance of the target element within the runtime instance of the the runtime instance of the UI currently displaying the subsequent part of the electronic document. The at least one hardware processor is further configured, in response to a successful identification of the runtime instance of the target element, to perform an action that reproduces a result of a human operator acting on the runtime instance of the target element.

According to another aspect, a non-transitory computer-readable medium stores instructions which, when executed by at least one hardware processor of a computer system, cause the computer system, in response to receiving a robotic process automation (RPA) script indicating a target element of a user interface (UI), to perform an attempt to identify a runtime instance of the target element within a runtime instance of the UI, the runtime instance of the UI currently displaying an initial part of an electronic document. If the attempt fails, the instructions further cause the at least one hardware processor to determine whether a UI container currently displaying the initial part of the electronic document is scrollable, and in response, if the UI container is scrollable, to activate a scroll control to cause the runtime instance of the UI to display a subsequent part of the electronic document. The instructions further cause the at least one hardware processor, in response to activating the scroll control, to perform another attempt to identify the runtime instance of the target element within the runtime instance of the UI, the runtime instance of the UI currently displaying the subsequent part of the electronic document. The instructions further cause the at least one hardware processor, in response to a successful identification of the runtime instance of the target element, to perform an action that reproduces a result of a human operator acting on the runtime instance of the target element.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized, searchable collection of data. Computer-readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
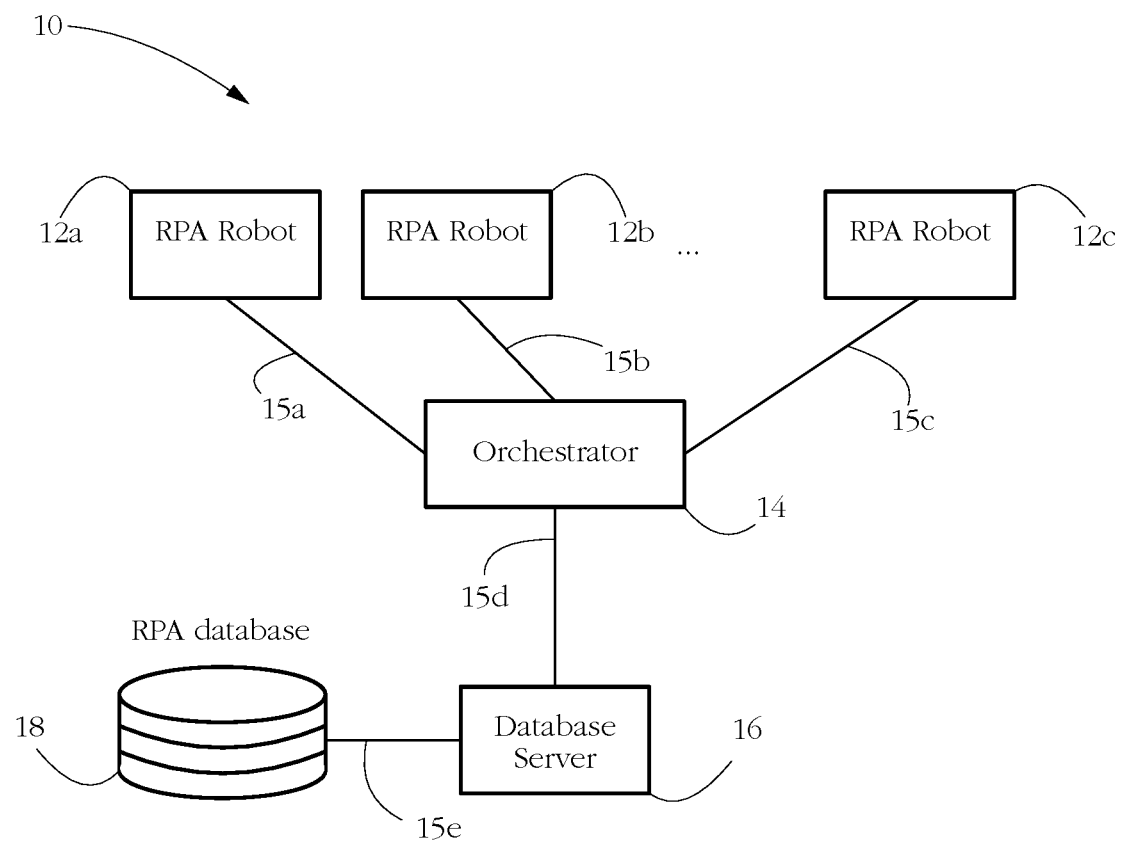
FIG. 1 shows an exemplary robotic process automation (RPA) environment according to some embodiments of the present invention.

FIG. 1 shows an exemplary robotic process automation (RPA) environment 10 according to some embodiments of the present invention. Environment 10 comprises various software components which collaborate to achieve the automation of a particular task. In an exemplary RPA scenario, an employee of a company uses a business application (e.g., word processor, spreadsheet editor, browser, email application) to perform a repetitive task, for instance to issue invoices to various clients. To actually carry out the respective task, the employee performs a sequence of operations/actions, which is herein deemed a process. Exemplary operations forming a part of an invoice-issuing process may include opening a Microsoft Excel® spreadsheet, looking up company details of a client, copying the respective details into an invoice template, filling out invoice fields indicating the purchased items, switching over to an email application, composing an email message to the respective client, attaching the newly created invoice to the respective email message, and clicking a 'Send' button. Various elements of RPA environment 10 may automate the respective process by mimicking the set of operations performed by the respective human operator in the course of carrying out the respective task.

Mimicking a human operation/action is herein understood to encompass reproducing the sequence of computing events that occur when a human operator performs the respective operation/action on the computer, as well as reproducing a result of the human operator's performing the respective operation on the computer. For instance, mimicking an action of clicking a button of a graphical user interface may comprise having the operating system move the mouse pointer to the respective button and generating a mouse click event, or may alternatively comprise toggling the respective GUI button itself to a clicked state.

Processes typically targeted for such automation include processing of payments, invoicing, communicating with business clients (e.g., distribution of newsletters and/or product offerings), internal communication (e.g., memos, scheduling of meetings and/or tasks), auditing, and payroll processing, among others. In some embodiments, a dedicated RPA design application 30 (FIG. 2) enables a human developer to design a software robot to implement a workflow that effectively automates a target process. A workflow typically comprises a sequence of custom automation steps, herein deemed activities. Each activity includes at least one action performed by the robot, such as clicking a button, reading a file, writing to a spreadsheet cell, etc. Activities may be nested and/or embedded. In some embodiments, RPA design application 30 exposes a user interface and set of tools that give the developer control of the execution order and the relationship between activities of a workflow. One commercial example of an embodiment of RPA design application 30 is UiPath StudioX®.

Some types of workflows may include, but are not limited to, sequences, flowcharts, finite state machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Figure 2:
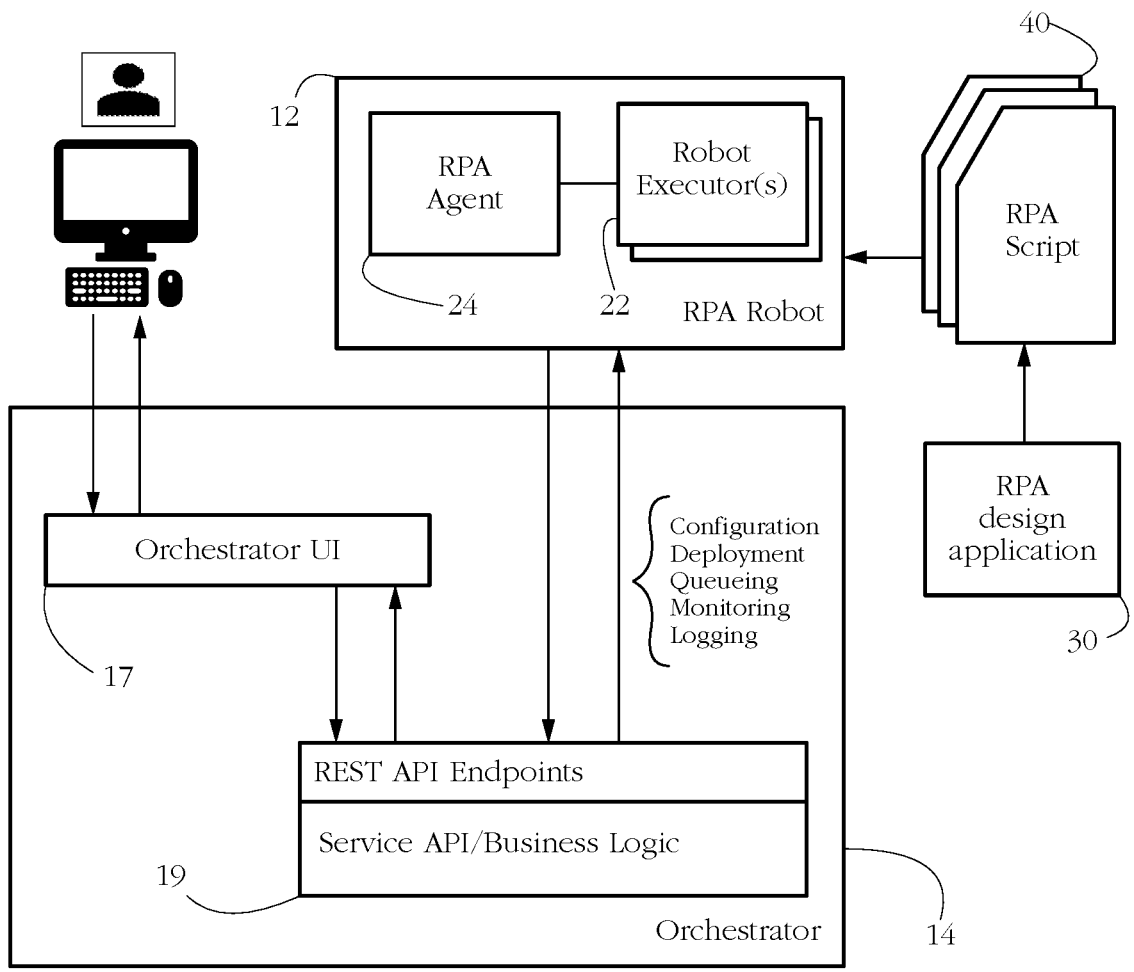
FIG. 2 illustrates exemplary components and operation of an RPA robot and orchestrator according to some embodiments of the present invention.

Once a workflow is developed, it may be encoded in computer-readable form as a set of RPA scripts 40 (FIG. 2). RPA scripts 40 may be formulated according to any data specification known in the art, for instance in a version of an extensible markup language (XML), Javascript Object Notation (JSON), or a programming language such as C#, Visual Basic, Java, etc. Alternatively, RPA scripts 40 may be formulated in an RPA-specific version of bytecode, or even as a sequence of instructions formulated in a natural language such as English, Spanish, Japanese, etc. In some embodiments, scripts 40 are pre-compiled into a set of native processor instructions (e.g., machine code).

A skilled artisan will appreciate that RPA design application 30 may comprise multiple components/modules, which may execute on distinct physical machines. In one such example illustrating a cloud computing embodiment of the present invention, RPA design application 30 may execute in a client-server configuration, wherein one component of application 30 may expose a robot design interface to a user of a client computer, and another component of application 30 executing on a server computer may assemble the robot workflow and formulate/output RPA script 40. For instance, a developer may access the robot design interface via a web browser executing on the client computer, while the software processing the user input received at the client computer actually executes on the server computer.

Once formulated, scripts 40 may be executed by a set of robots 12*a-c* (FIG. 1), which may be further controlled and coordinated by an orchestrator 14. Robots 12*a-c* and orchestrator 14 may each comprise a plurality of computer programs, which may or may not execute on the same physical machine. Exemplary commercial embodiments of robots 12*a-c* and orchestrator 14 include UiPath Robots® and UiPath Orchestrator®, respectively. Types of robots 12*a-c* include, but are not limited to, attended robots, unattended robots, development robots (similar to unattended robots, but used for development and testing purposes), and non-production robots (similar to attended robots, but used for development and testing purposes).

Attended robots are triggered by user events and/or commands and operate alongside a human operator on the same computing system. In some embodiments, attended robots can only be started from a robot tray or from a command prompt and thus cannot be controlled from orchestrator 14 and cannot run under a locked screen, for example. Unattended robots may run unattended in remote virtual environments and may be responsible for remote execution, monitoring, scheduling, and providing support for work queues.

Orchestrator 14 may have various capabilities including, but not limited to, provisioning, deployment, configuration, queueing, monitoring, logging, and/or providing interconnectivity for robots 12*a-c*. Provisioning may include creating and maintaining connections between robots 12*a-c* and orchestrator 14. Deployment may include ensuring the correct delivery of software (e.g, RPA scripts 40) to robots 12*a-c* for execution. Configuration may include maintenance and delivery of robot environments and workflow configurations. Queueing may include providing management of job queues and queue items. Monitoring may include keeping track of robot state and maintaining user permissions. Logging may include storing and indexing logs to a database and/or another storage mechanism (e.g., SQL, ElasticSearch®, Redis®). Orchestrator 14 may further act as a centralized point of communication for third-party solutions and/or applications.

FIG. 2 shows exemplary components of a robot 12 and orchestrator 14 according to some embodiments of the present invention. An exemplary RPA robot is constructed using a Windows® Workflow Foundation Application Programming Interface from Microsoft, Inc. Robot 12 may comprise a set of executors 22 and an RPA agent 24. Robot executors 22 are configured to receive RPA script 40 indicating a sequence of activities that mimic the actions of a human operator carrying out a business process, and to actually perform the respective sequence of activities on the respective client machine. In some embodiments, robot executor(s) 22 comprise an interpreter (e.g., a just-in-time interpreter or compiler) configured to translate RPA script 40 into a runtime package comprising processor instructions for carrying out the operations described in the respective script. Executing script 40 may thus comprise executor(s) 22 translating RPA script 40 and instructing a processor of the respective host machine to load the resulting runtime package into memory and to launch the runtime package into execution.

RPA agent 24 may manage the operation of robot executor(s) 22. For instance, RPA agent 24 may select tasks/scripts for execution by robot executor(s) 22 according to an input from a human operator and/or according to a schedule. Agent 24 may start and stop jobs and configure various operational parameters of executor(s) 22. When robot 12 includes multiple executors 22, agent 24 may coordinate their activities and/or inter-process communication. RPA agent 24 may further manage communication between RPA robot 12 and orchestrator 14 and/or other entities.

In some embodiments executing in a Windows® environment, robot 12 installs a Microsoft Windows® Service Control Manager (SCM)-managed service by default. As a result, such robots can open interactive Windows® sessions under the local system account and have the processor privilege of a Windows® service. For instance, a console application may be launched by a SCM-managed robot. In some embodiments, robot 12 can be installed at a user level of processor privilege (user mode, ring 3.) Such a robot has the same rights as the user under which the respective robot has been installed. For instance, such a robot may launch any application that the respective user can. On computing systems that support multiple interactive sessions running simultaneously (e.g., Windows® Server 2012), multiple robots may be running at the same time, each in a separate Windows® session, using different usernames.

In some embodiments, robot 12 and orchestrator 14 may execute in a client-server configuration. It should be noted that the client side, the server side, or both, may include any desired number of computing systems (e.g., physical or virtual machines) without deviating from the scope of the invention. In such configurations, robot 12 including executor(s) 22 and RPA agent 24 may execute on a client side. Robot 12 may run several jobs/workflows concurrently. RPA agent 24 (e.g., a Windows® service) may act as a single client-side point of contact of executors 22. Agent 24 may further manage communication between robot 12 and orchestrator 14. In some embodiments, communication is initiated by agent 24, which may open a WebSocket channel to orchestrator 14. Agent 24 may subsequently use the channel to transmit notifications regarding the state of each executor 22 to orchestrator 14, for instance as a heartbeat signal. In turn, orchestrator 14 may use the channel to transmit acknowledgements, job requests, and other data such as RPA scripts 40 to robot 12.

Orchestrator 14 may execute on a server side, possibly distributed over multiple physical and/or virtual machines. In one such embodiment, orchestrator 14 may include an orchestrator user interface (UI) 17 which may be a web application, and a set of service modules 19. Service modules 19 may further include a set of Open Data Protocol (OData) Representational State Transfer (REST) Application Programming Interface (API) endpoints, and a set of service APIs/business logic. A user may interact with orchestrator 14 via orchestrator UI 17 (e.g., by opening a dedicated orchestrator interface on a browser), to instruct orchestrator 14 to carry out various actions, which may include for instance starting jobs on robot 12, creating robot groups/pools, assigning workflows to robots, adding/removing data to/from queues, scheduling jobs to run unattended, analyzing logs per robot or workflow, etc. Orchestrator UI 17 may use Hypertext Markup Language (HTML), JavaScript (JS), or any other data format known in the art.

Orchestrator 14 may carry out actions requested by the user by selectively calling service APIs/business logic. In addition, orchestrator 14 may use the REST API endpoints to communicate with robot 12. The REST API may include configuration, logging, monitoring, and queueing functionality. The configuration endpoints may be used to define and configure application users, permissions, robots, assets, releases, etc. Logging REST endpoints may be used to log different information, such as errors, explicit messages sent by the robots, and other environment-specific information, for instance. Deployment REST endpoints may be used by robots to query the version of RPA script 40 to be executed. Queueing REST endpoints may be responsible for queues and queue item management, such as adding data to a queue, obtaining a transaction from the queue, setting the status of a transaction, etc. Monitoring REST endpoints may monitor the web application component of orchestrator 14 and RPA agent 24.

In some embodiments, RPA environment 10 (FIG. 1) further comprises a database server 16 connected to an RPA database 18. In an embodiment wherein server 16 is provisioned on a cloud computing platform, server 16 may be embodied as a database service, e.g., as a client having a set of database connectors. Database server 16 is configured to selectively store and/or retrieve data related to RPA environment 10 in/from database 18. Such data may include configuration parameters of various robots 12*a-c*, robot pools, as well as data characterizing workflows executed by various robots, and data characterizing users, roles, schedules, queues, etc. Another exemplary category of data stored and/or retrieved by database server 16 includes data characterizing the current state of each executing robot. Yet another exemplary category of data includes messages logged by various robots during execution. Database server 16 and database 18 may employ any data storage protocol and format known in the art, such as structured query language (SQL), ElasticSearch®, and Redis®, among others. In some embodiments, data is gathered and managed by orchestrator 14, for instance via logging REST endpoints. Orchestrator 14 may further issue structured queries to database server 16.

In some embodiments, RPA environment 10 (FIG. 1) further comprises communication channels/links 15*a-e* interconnecting various members of environment 10. Such links may be implemented according to any method known in the art, for instance as virtual network links, virtual private networks (VPN), or end-to-end tunnels. Some embodiments further encrypt data circulating over some or all of links 15*a-e*.

Figure 3:
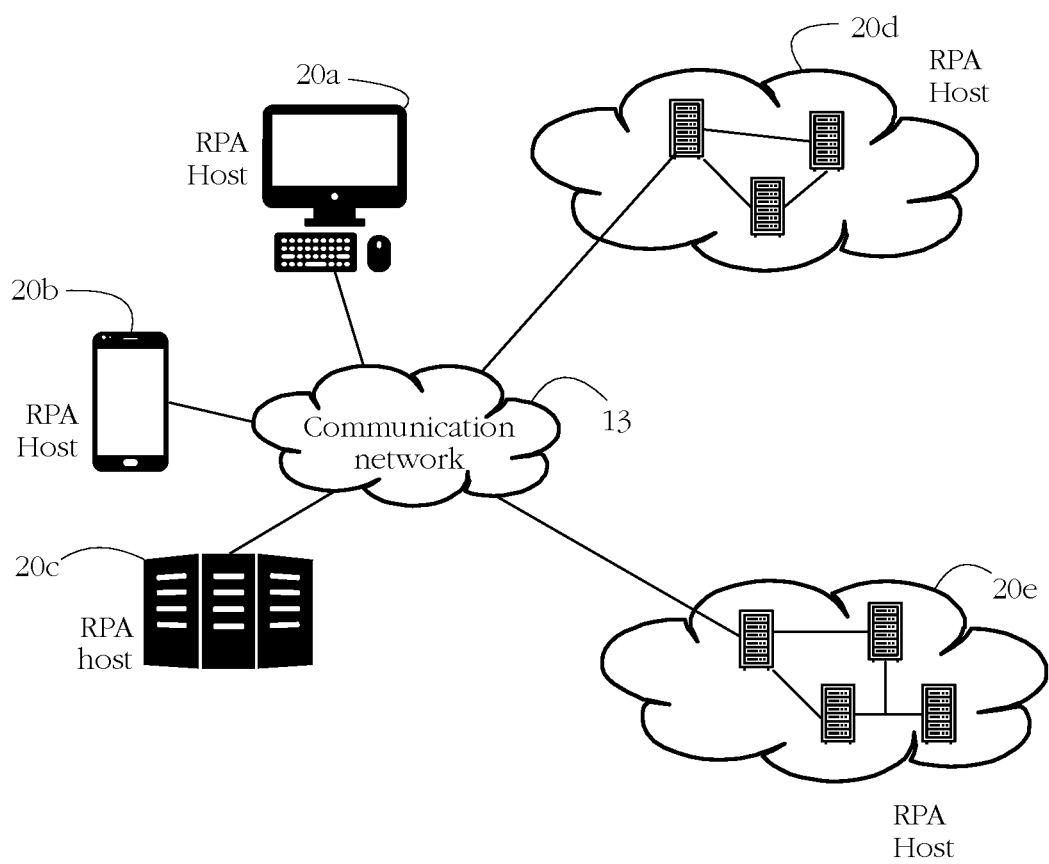
FIG. 3 shows a variety of RPA host systems according to some embodiments of the present invention.

A skilled artisan will understand that various components of RPA environment 10 may be implemented and/or may execute on distinct host computer systems (physical appliances and/or virtual machines). FIG. 3 shows a variety of such RPA host systems 20*a-e* according to some embodiments of the present invention. Each host system 20*a-e* represents a computing system (an individual computing appliance or a set of interconnected computers) having at least a hardware processor and a memory unit for storing processor instructions and/or data. Exemplary RPA hosts 20*a-c* include corporate mainframe computers, personal computers, laptop and tablet computers, mobile telecommunication devices (e.g., smartphones), and e-book readers, among others. Other exemplary RPA hosts illustrated as items 20*d-e* include a cloud computing platform comprising a plurality of interconnected server computer systems centrally-managed according to a platform-specific protocol. Clients may interact with such cloud computing platforms using platform-specific interfaces/software layers/libraries (e.g., software development kits—SDKs, plugins, etc.) and/or a platform-specific syntax of commands. Exemplary platform-specific interfaces include the Azure® SDK and AWS® SDK, among others. RPA hosts 20*a-e* may be communicatively coupled by a communication network 13, such as the Internet.

Figure 4:
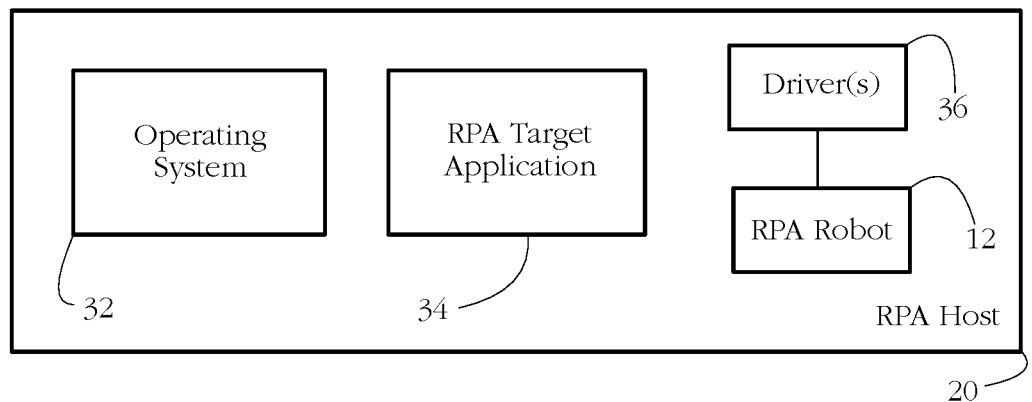
FIG. 4 shows exemplary RPA components executing on an RPA host according to some embodiments of the present invention.

FIG. 4 shows exemplary software components executing on an RPA host system 20 according to some embodiments of the present invention. Host system 20 generically represents any of RPA host systems illustrated in FIG. 3. In some embodiments, beside an RPA robot 12, RPA host 20 executes an operating system (OS) 32 and an instance of an RPA target application 34, i.e., the software application targeted for automation by robot 12. In some embodiments that employ hardware virtualization technologies, some or all of the illustrated components may execute within a virtual machine (VM).

OS 32 may comprise any widely available operating system such as Microsoft Windows®, MacOS®, Linux®, iOS®, or Android™, among others, comprising a software layer that interfaces between application 34 and the hardware of RPA host 20. RPA target application 34 generically represents any computer program used by a human operator to carry out a task. Exemplary applications 34 include, among others, a word processor, a spreadsheet application, a graphics application, a browser, a social media application, a gaming application, and an electronic communication application.

In some embodiments, robot 12 carries out user interface automation activities by interfacing with a set of drivers 36 executing on the respective host. Driver(s) 36 generically represent software modules that carry low-level operations such as moving a cursor on screen, registering and/or executing mouse, keyboard, and/or touchscreen events, detecting a current posture/orientation of a handheld device, detecting a current accelerometer reading, taking a photograph with a smartphone camera, etc. Some such drivers 36 form a part of operating system 32. Others may implement various application-specific aspects of a user's interaction with complex target applications 34 such as SAP®, Citrix® virtualization software, Excel®, etc. Such drivers 36 may include, for instance, browser drivers, virtualization drivers, and enterprise application drivers, among others. Other exemplary drivers 36 include the Microsoft® WinApp-Driver, XCTest drivers from Apple, Inc., and UI Automator drivers from Google, Inc.

Figure 5:
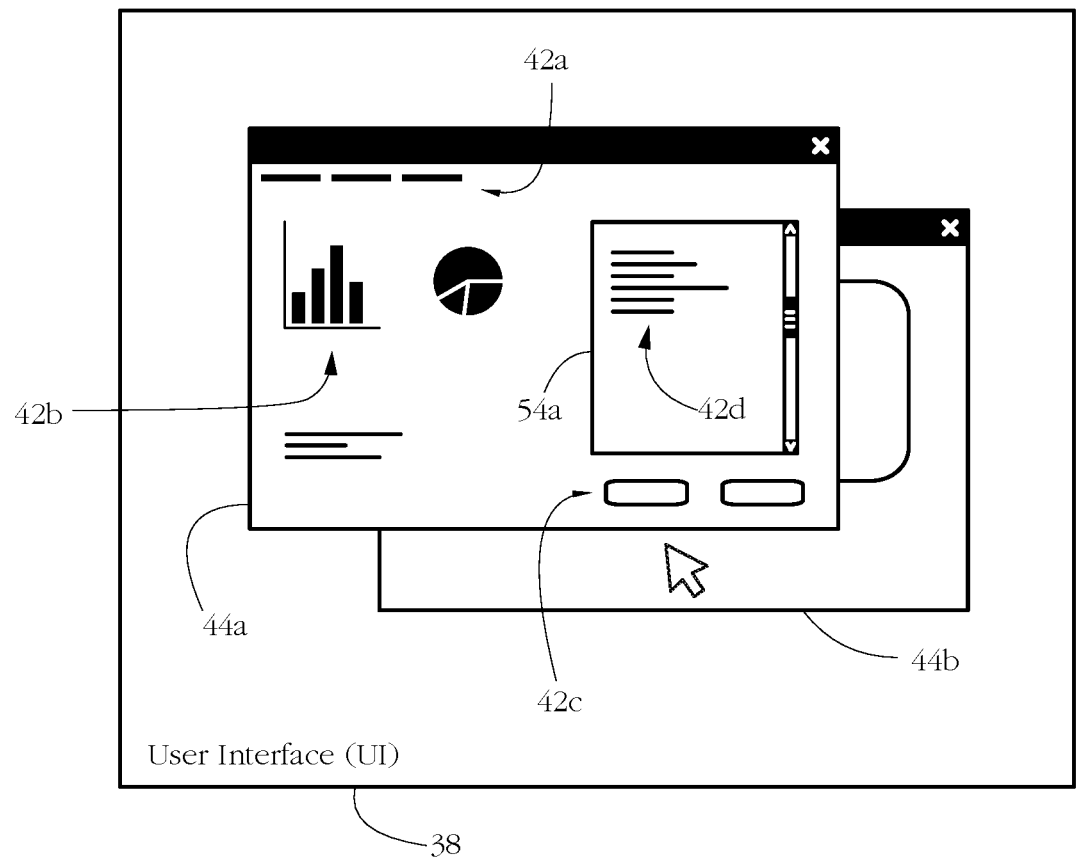
FIG. 5 shows an exemplary user interface (UI) having a plurality of UI elements according to some embodiments of the present invention.

RPA target application 34 is typically configured to expose a user interface (UI). A user interface is a computer interface that enables human-machine interaction, i.e., an interface configured to receive user input and to respond to the respective input. A common example of user interface is known as a graphical user interface (GUI), which enables human-machine interaction via a set of visual elements displayed to the user. FIG. 5 shows such an exemplary UI 38 according to some embodiments of the present invention. Illustrative UI 38 has a set of exemplary windows 44*a-b* and a set of exemplary UI elements including a menu indicator 42*a*, an icon 42*b*, a button 42*c*, and a text item 42*d*. Other exemplary UI elements comprise, among others, a window, a label, a form, a widget, an individual form field, a toggle, a link (e.g., a hyperlink, hypertext, or a uniform resource identifier), and a spreadsheet cell. UI elements may display information, receive input (text, mouse events, etc.), and/or control a functionality of software and/or the respective computer system.

Operating system 32 renders and manages UI 38 according to an internal data structure specifying various characteristics of UI 38, such as a size, position, and color of various UI elements, etc. Typical UI data structures comprise a hierarchy of objects, each having multiple attributes. Examples include a GUI tree and a DOM model, among others. Each UI element may thus be represented by a subset of attribute-value pairs of the UI specification. Some attributes of the UI specification may indicate, for instance, whether a particular element is scrollable (see more details below).

Some UI elements are responsive in the sense that acting on them (e.g., clicking button 42*c*) triggers a behavior/reaction. Such behaviors/reactions are typically specific to the respective element or to a group of elements. For instance, clicking a save button produces a different effect to clicking a print button. The same keyboard shortcut (e.g., Ctrl-G) may have one effect when executed in one window/application, and a completely different effect when executed in another window/application. So, although the operation/action/activity is the same (executing a click, pressing a combination of keyboard keys, writing a sequence of characters, etc.), the result of the respective action may depend substantially on the operand of the respective operation. An operand is herein defined as the UI element that is acted upon by a current activity such as a click or a keyboard event, or stated otherwise, the UI element selected to receive the respective user input. The terms 'operand' and 'target' are herein used interchangeably.

Some user interfaces have dedicated containers for displaying certain kinds of content. A UI container herein denotes a specific part/region of a UI, distinctly identified in a data specification of the respective UI, for instance as a separate branch of the GUI tree. Examples of containers include a window, a frame, a menu bar/panel, and a notification area, among others. Some containers may be reserved for displaying specific types of content. For instance, an exemplary browser UI may have one container for displaying a menu including a field for receiving a URL, and a separate container/window for rendering a content of an HTML document. An exemplary movie player UI may have one container reserved for displaying video content and another container for displaying a set of controls for adjusting the volume, configuring subtitles, etc. FIG. 5 shows an exemplary container 54*a* configured to display at least a part of a text document (illustrated as text item 42*d*). Some containers may be scrollable, as further discussed below.

Some embodiments of RPA design application 30 attach an element ID to each target UI element, which enables robot 12 to identify the target at runtime, i.e., within a runtime instance of the target UI. The element ID is also known in the art as a selector, so the terms 'selector' and 'element ID' are herein used interchangeably. In some embodiments, the element ID comprises a data structure that selectively identifies the respective UI element among the plurality of UI elements of interface 38. In one such example, the element ID comprises a selected subset of attribute-value pairs encoding various characteristic features of the respective UI element. In some embodiments, the respective set of attribute-value pairs indicates a position of the respective UI element in an object hierarchy of UI 38. For instance, the selector may indicate that respective UI element is a form field of a specific form displayed within a specific UI window. Other characteristic features included in the selector may comprise an image of the respective UI element, a text displayed on top of the respective UI element, etc.

Figure 6:
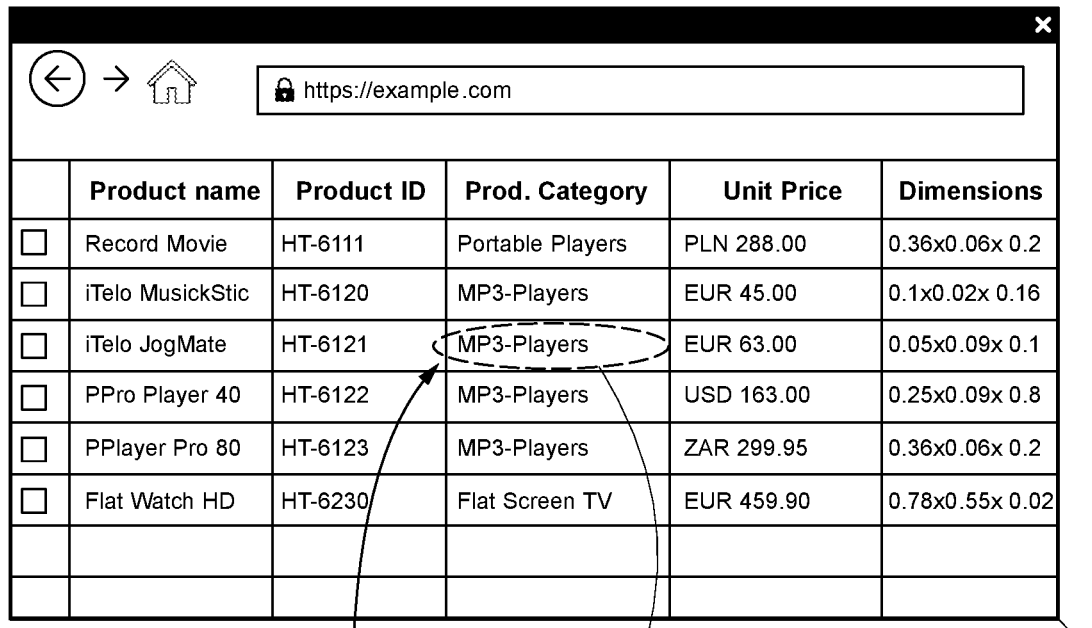
FIG. 6 shows an exemplary target UI element identified by an element ID according to some embodiments of the present invention.

FIG. 6 illustrates an exemplary user interface 38*a* currently displaying a part of a spreadsheet, wherein a target UI element 42 comprises a particular cell of the respective spreadsheet. An exemplary element ID/selector 50 comprises a plurality of attribute-value pairs characterizing UI element 42, for instance as a cell displaying the text 'MP3-Players' located within a table exposed by a Google Chrome® browser window. Exemplary selector 50 is formulated in a version of XML using a set of tags, but this aspect is not meant to be limiting. Alternative embodiments may use any encoding known in the art, for instance JSON, among others.

Selector 50 may be specified at design time by including an encoding of the respective selector in RPA script 40. At runtime, robot 12 may attempt to identify a runtime instance of target 42 within a runtime instance of UI 38 according to selector 50 and possibly according to other information, such as another UI element located in the vicinity of the target, etc. The attempt may fail for various reasons. For instance, some of the characteristic features of the target UI element may have changed between design time and runtime. In other situations, the target document may be too large to fit within UI 38 all at once, so the target UI element may not be currently visible. To address such situations, some embodiments of robot 12 automatically scroll the content of the runtime instance of UI 38 while searching for the target.

To facilitate the display and user interaction with large documents (e.g., spreadsheets, webpages), some user interfaces implement a content scrolling mechanism, wherein the respective UI may display only a part of a current document at any time, but also expose a set of scroll controls enabling the user to scroll through the respective document. Scrolling herein denotes switching the respective UI (e.g., the respective container) from displaying one part to displaying another part of the current document. A typical example of scrolling includes moving a current content of the UI in a specified direction (up/down, left/right) thereby gradually uncovering new content. Another example of scrolling encountered in an e-book reader interface comprises advancing to the next page of a book. Yet another example specific to web browsing comprises fetching new content from a web server in response to a user's scrolling to the bottom of a currently displayed web page.

A scroll control herein denotes a device/widget that, when activated, causes scrolling of the content currently displayed by the respective interface. Some scroll controls comprise UI elements, such as a button, icon, or particular area of the respective user interface. Such scroll controls may be activated by clicking, tapping, or otherwise acting upon the respective UI element. Other exemplary scroll controls comprise hardware events not connected to a particular UI element. For instance, pressing an arrow key on a keyboard and rolling a scroll wheel of a mouse causes scrolling in a variety of user interfaces. Other examples of hardware events that cause scrolling include events triggered by some hand gestures, such as a swiping across a touchscreen or trackpad. Scroll controls may be interface-specific, hardware-specific, and/or application-specific. For instance, some scroll controls may only be active on certain devices (e.g., handheld devices equipped with a touchscreen). Furthermore, scroll controls used to manipulate the display of a spreadsheet may differ from scroll controls implemented in a browser interface.

FIGS. 7-8-9-10 show various examples of user interfaces exposing scroll controls according to some embodiments of the present invention. The visual appearance and/or positioning of various scroll controls are provided only for illustrative purposes and are not meant to limit the scope of the present invention.

Figure 7:
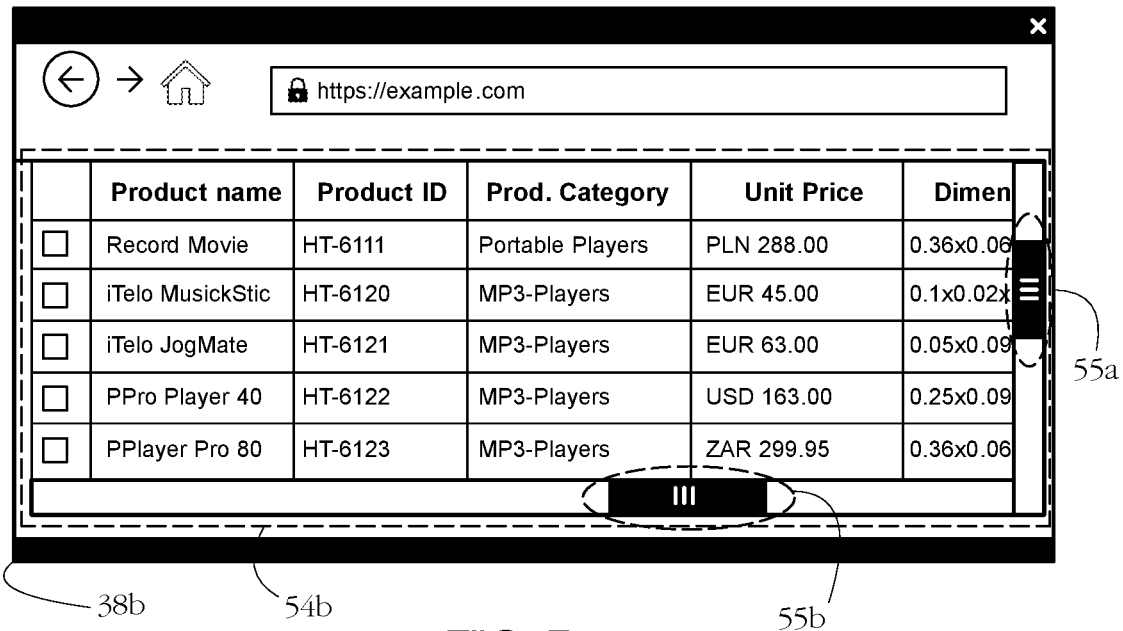
FIG. 7 shows an exemplary UI exposing a set of scroll controls according to some embodiments of the present invention.

Exemplary UI 38b in FIG. 7 displays a part of a spreadsheet within a dedicated container 54b. A set of exemplary scroll controls 55a-b of container 54b comprise scroll bars (also known in the art as thumbs, handles, or grips) which, when dragged in a pre-determined direction, cause scrolling in the respective direction. When the UI currently displays one part of the spreadsheet, such scrolling will bring another part of the spreadsheet into view.

Figure 8:
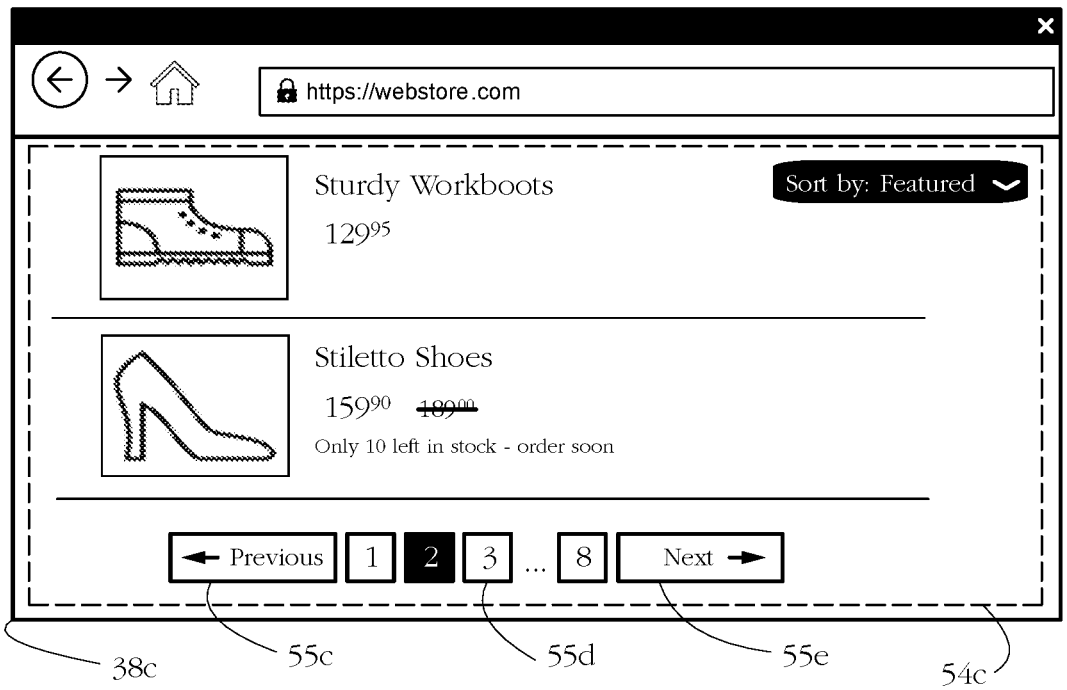
FIG. 8 shows another exemplary UI exposing a set of scroll controls according to some embodiments of the present invention.

The exemplary user interface 38c of FIG. 8 comprises a web browser interface comprising a container 54c for rendering HTML, documents. FIG. 8 shows container 54c currently displaying a part of a webpage listing products for sale in a webstore. A set of exemplary navigation scroll controls 55c-d-e of container 54c enable various ways of scrolling through the respective webpage, for instance advancing to a next part of the list of products (control 55e), or jumping to a particular section of the list (control 55d). In some embodiments, activating a navigation scroll control may cause UI 38b to actively fetch new content from the respective webserver. Alternatively, the respective content may be pre-fetched. The illustrated scroll controls may take any form known in web design. In one alternative example, the list of products may be presented using a slider or carousel design, whereby users may scroll through the list by swiping left or right on a touchscreen. In another example, controls 55c-d-e may be normally hidden and may be revealed by hovering the mouse over a particular region of UI 38c.

Figure 9:
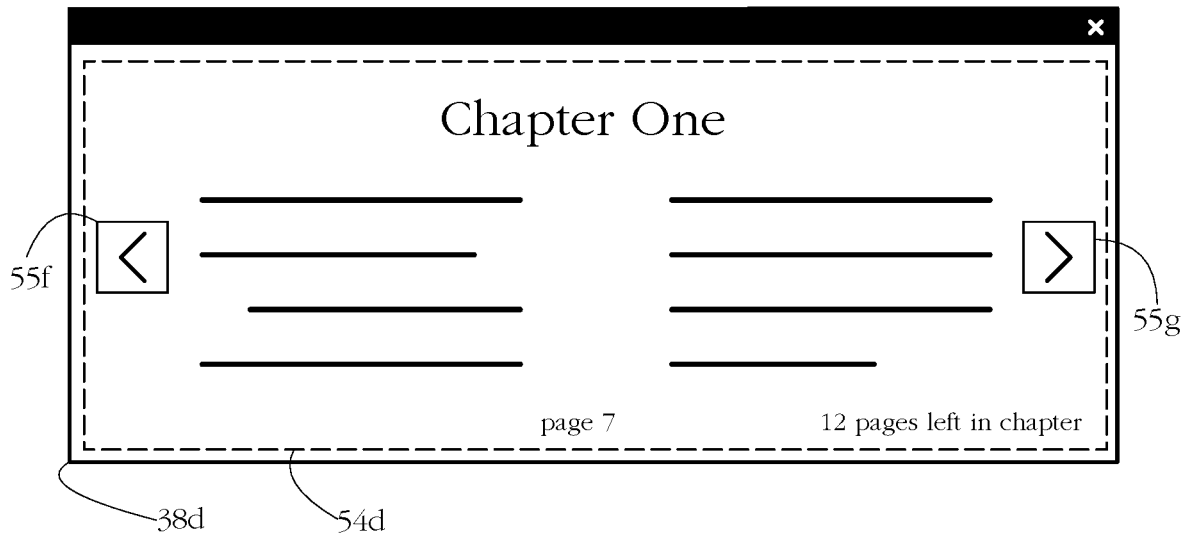
FIG. 9 shows yet another exemplary UI exposing a set of scroll controls according to some embodiments of the present invention.

FIG. 9 shows yet another exemplary UI 38d comprising an e-book reader interface currently displaying a page of a book within a dedicated container 54d. A set of exemplary page-turning scroll controls 55f-g of container 54d enable a user to scroll through the book, e.g., to advance to the next page. Each scroll control 55f-g may comprise a UI element, for instance a particular region of UI 38d which, when tapped, may cause scrolling. Some interfaces hide page-turning controls 55f-g and only reveal them when the mouse cursor hovers over the respective region. Alternative page-turn scroll controls may include hardware events triggered by hand gestures such as swiping anywhere on the screen.

Figure 10:
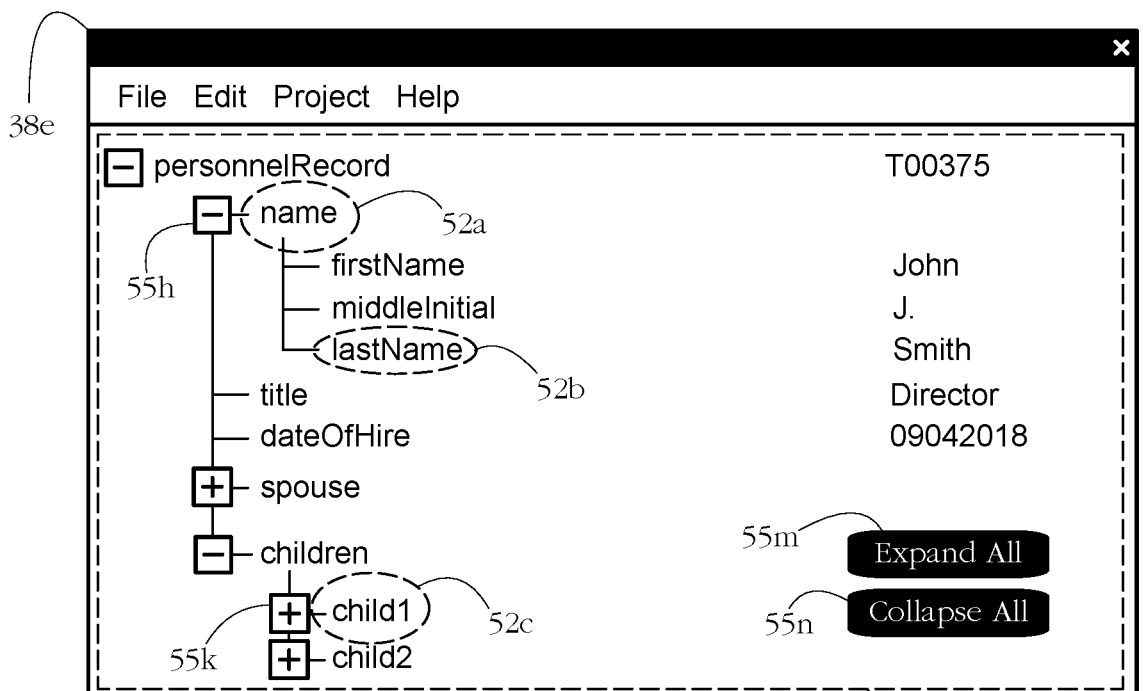
FIG. 10 shows yet another exemplary UI exposing a set of scroll controls according to some embodiments of the present invention.

FIG. 10 shows another exemplary UI 38e configured to display information which is organized hierarchically, e.g., as a tree wherein individual attributes of a data item may represent individual tree branches (also known in the art as nodes). A common example comprises a dropdown list or menu. Some nodes which are herein deemed collapsible, e.g., nodes 52a and 52c in FIG. 10, may themselves have sub-nodes. Other nodes such as exemplary node 52b are non-collapsible, have no sub-nodes, and intuitively correspond to an end-node (leaf) of the tree. In some embodiments, a container 54e displays a set of expand/collapse scroll controls 55h-k-m-n that control the selective display of information within container 54e. The illustrated example currently shows sub-nodes of node 52a, but does not show sub-nodes of node 52c. It is said that node 52a is currently in an expanded state, while node 52c is in a collapsed state. In some embodiments, activating collapse scroll control 55h (e.g., by clicking it) toggles node 52a to a collapsed state, thereby hiding its respective subnodes (firstName, middleInitial, and lastName). Meanwhile, activating expand scroll control 55k may toggle node 52c to an expanded state, revealing information which was previously not displayed within UI 38e (for instance the name and date of birth of the first child). In some embodiments, scroll controls 55m and 55n may be configured to respectively expand all and collapse all collapsible nodes of the respective document.

In some embodiments of the present invention, RPA robot 12 may be configured to automatically scroll through a document in search of a target UI element, as described in detail below. The behavior of the robot may be configured at design time, for instance by way of a robot design interface exposed by RPA design application 30.

Figure 11:
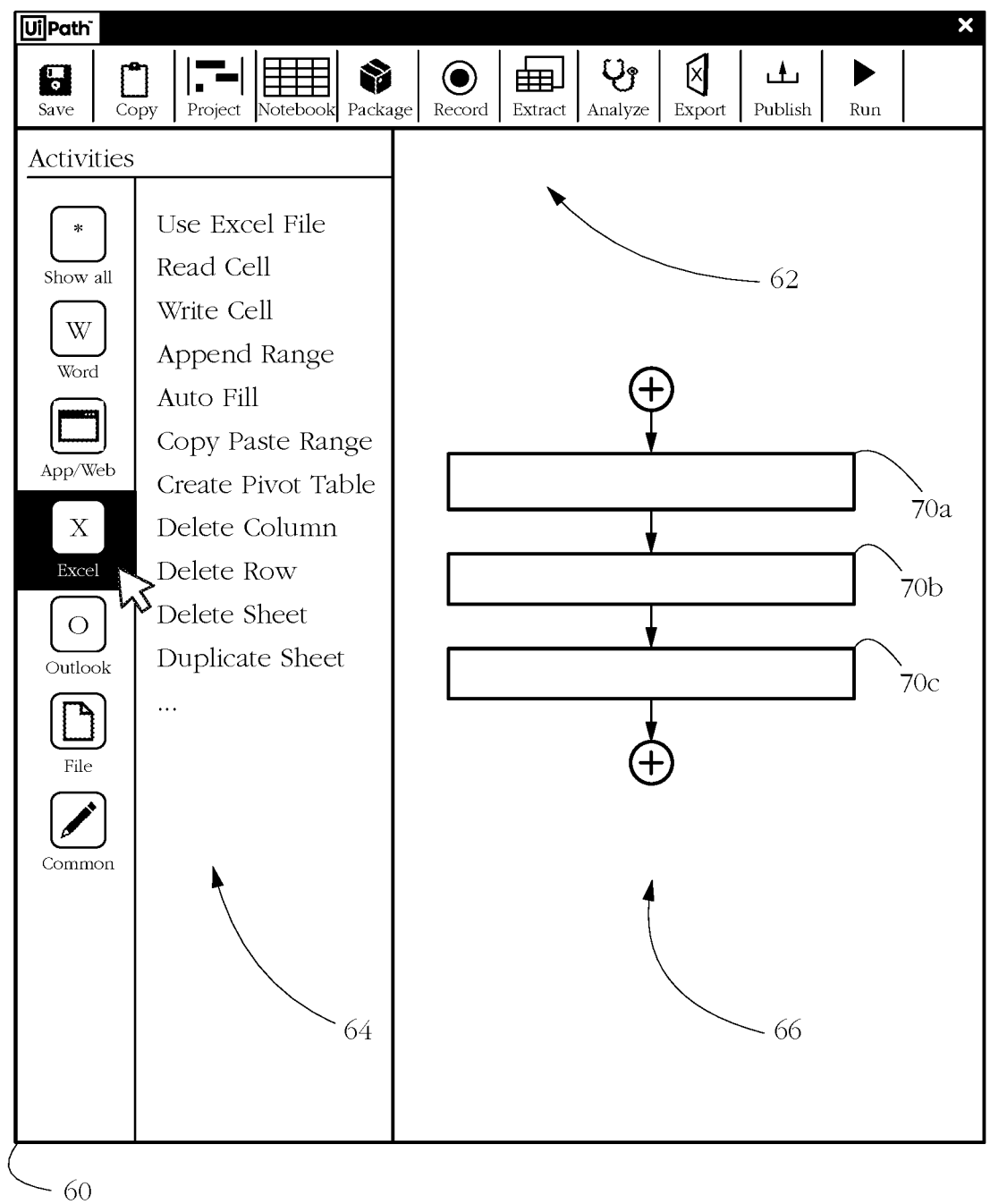
FIG. 11 illustrates an exemplary robot design interface according to some embodiments of the present invention.

FIG. 11 shows an exemplary robot design interface 60 exposed by RPA design application 30 according to some embodiments of the present invention. Interface 60 may be configured to enable a user to program RPA robot 12 by using a set of intuitive visual tools, instead of coding per se. For instance, interface 60 may enable the user to build a robot from a set of individual building blocks assembled in sequence. Such building blocks may comprise various activities, such as opening an instance of RPA target application 34, clicking on a UI element of application 34, filling out a form field, etc.

In one example illustrated in FIG. 11, robot design interface 60 comprises a main menu/ribbon 62 including a plurality of menu items for performing actions such as opening, saving, and managing robot projects, recording a set of actions to be performed by robot 12, and executing robot 12, among others. Robot design interface 60 may further expose an activity menu 64 listing a plurality of available activities for building software robots. For convenience, activity menu 64 may be organized into a hierarchy of submenus. In the example of FIG. 11, available activities are organized into submenus according to a type of target application (e.g., activities for interacting with Microsoft Word® are grouped together into a submenu, while activities for interacting with a web browser are grouped into another submenu). For instance, FIG. 11 shows an expanded activity submenu labeled 'Excel', comprising activities for interacting with spreadsheets. Such exemplary spreadsheet activities may comprise reading from and writing data to spreadsheet cells, inserting and/or deleting rows and columns, adding/deleting/renaming spreadsheets, creating pivot tables, sorting tables, filtering, running various spreadsheet macros, etc. Other grouping criteria may be used to organize activity menu 64, for instance, activities may be grouped according to a type of target object: file-related activities such as opening, creating, deleting, and downloading a file may be grouped together into a submenu, while image-related activities may be grouped into another submenu.

In some embodiments, robot design interface 60 further comprises a workflow area configured to display a workflow 66 comprising a visual representation of a set of already selected robot activities arranged in sequence according to a desired order of execution of the respective activities. In the example of FIG. 11, individual activities are represented by activity containers 70-a-c connected by arrows in the manner of a computer flowchart. In some embodiments, the user may access each individual activity by clicking inside the respective activity container 70a-c. In response to detecting such a click, some embodiments may expose an activity configuration interface enabling the user to configure various aspects of the respective activity, as further detailed below.

Figure 12:
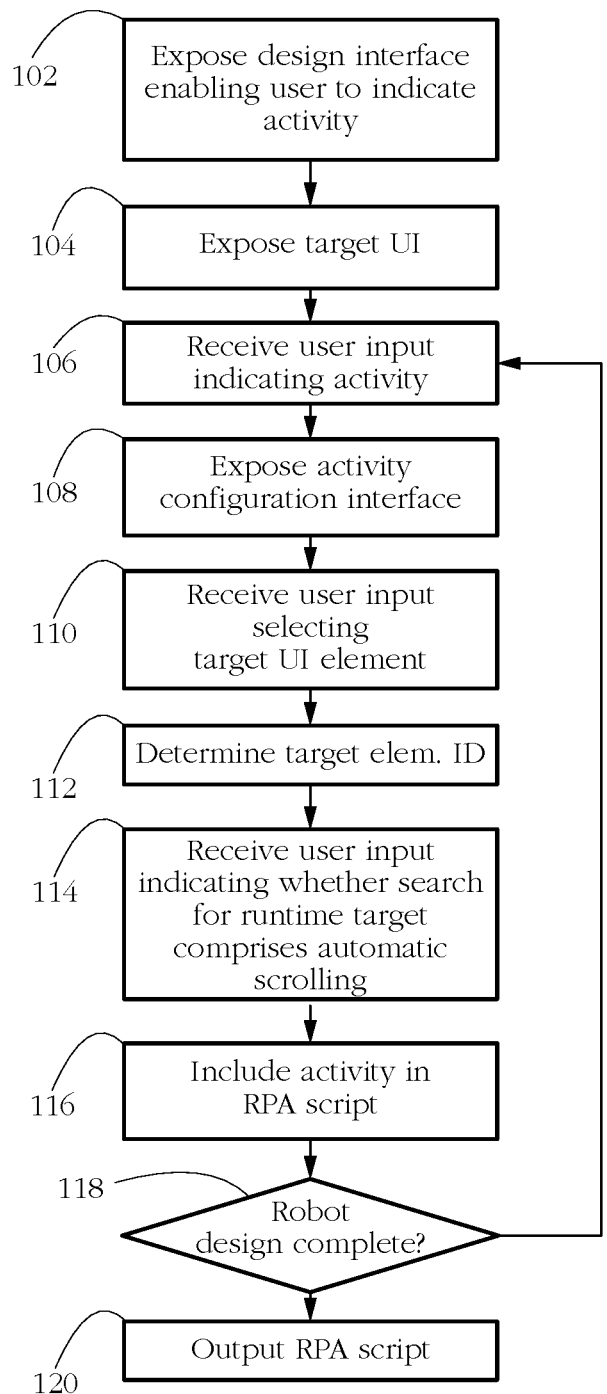
FIG. 12 shows an exemplary sequence of steps performed by an RPA design application according to some embodiments of the present invention.

FIG. 12 shows an exemplary sequence of steps performed by RPA design application 30 according to some embodiments of the present invention. In response to exposing robot design interface 60, some embodiments may receive user input indicating a target application. A step 104 may then open an instance of the respective target application, which in turn exposes a target user interface for the robot to interact with. In one example wherein the respective robot has to read data from a spreadsheet cell, the target application may comprise an instance of Microsoft Excel®, and the target UI may comprise the Excel® interface currently displaying a part of the target spreadsheet. A sequence of steps 106-118 may then be repeated for each activity that the robot must execute.

In a step 106, application 30 may receive a user input indicating a choice of activity. For instance, step 106 may comprise the user's selecting an activity (e.g., Read Cell) from activity menu 64 in FIG. 11. Some embodiments may then insert an activity container corresponding to the respective activity into workflow 66. Some embodiments may then expose an activity configuration interface enabling the user to configure various parameters of the respective activity. Such parameters are in general activity-specific, and may include a target UI element for the respective activity. In the example comprising reading spreadsheet data, the target UI element may comprise the cell(s) which the robot must read. In a step 112, RPA design application 30 may receive user input defining at least one target UI element for the respective activity.

Figure 13:
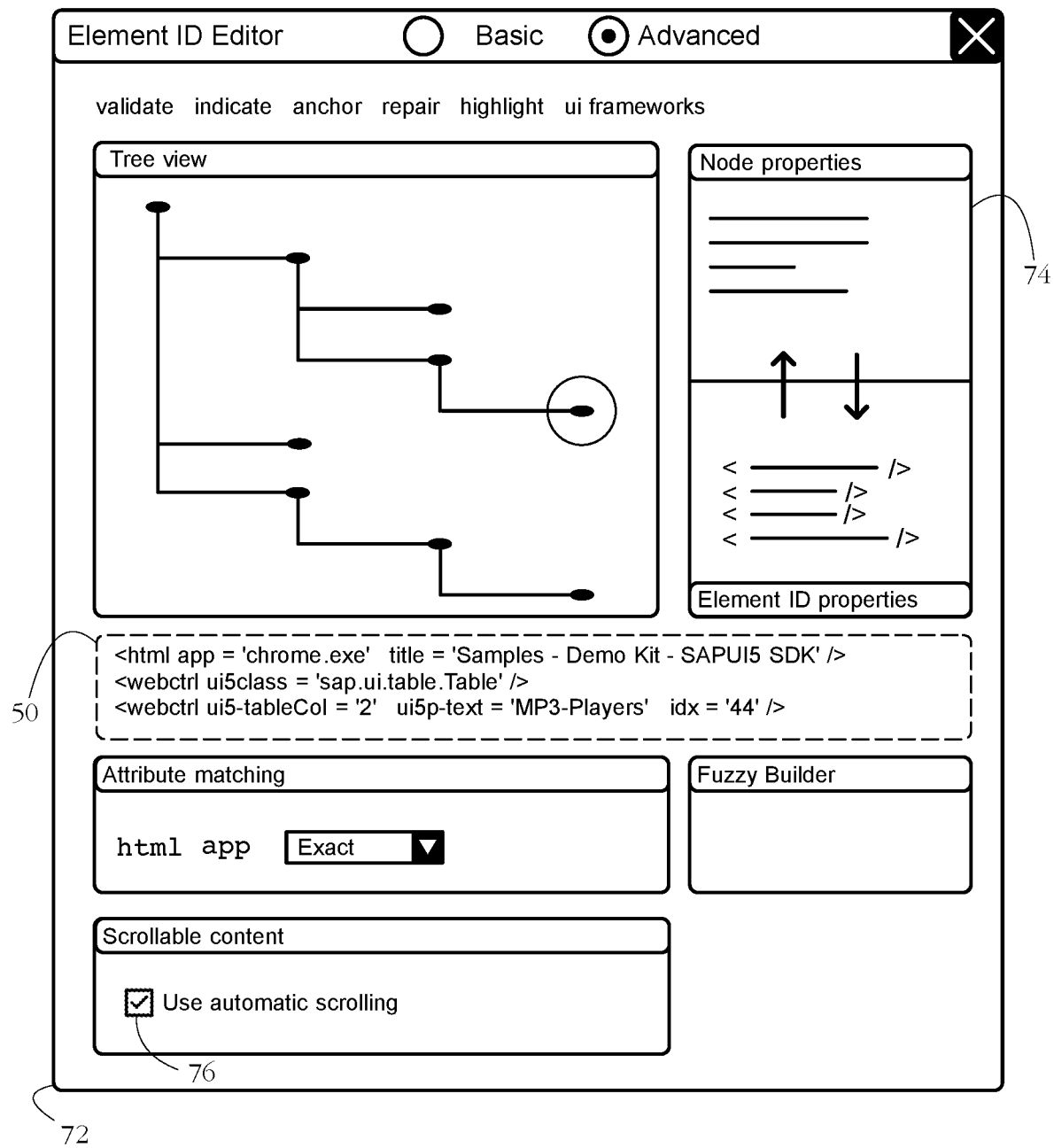
FIG. 13 shows an exemplary target configuration interface according to some embodiments of the present invention.

To allow the user to indicate the target UI element, some embodiments automatically bring the target UI into focus so that the user can indicate the target UI element by directly clicking/tapping it. Some embodiments may also expose a target configuration interface enabling the user to specify the target UI in more detail. FIG. 13 shows an example of such a target configuration interface 72, comprising a window having various zones, for instance an area for displaying a tree view of the target UI, which allows the user to easily visualize the selected target UI element as a node in a tree representation of the target UI. Target configuration interface 72 may further display element ID 50, allowing the user to visualize currently defined tags and/or attributes-value pairs characterizing the respective target UI element. Some embodiments may further include a selector builder pane 74 enabling the user to select which characteristics or attributes to include in element ID 50.

In a step 114 (FIG. 12), RPA design application 30 may receive user input indicating whether robot 12 should use automatic scrolling to identify the runtime target. In some embodiments as illustrated in FIG. 13, interface 72 comprises a control 76 allowing the user to opt for automatic scrolling. In some embodiments, the choice of whether to use automatic scrolling may be taken automatically, at design time (by application 30) or runtime (by robot 12), for instance according to a type of activity, according to a type of target UI, according to a type of target UI element, and/or according to a device type of the respective RPA host. For example, automatic scrolling may be automatically enabled for spreadsheet manipulations (e.g., an SAP® interface), and automatically disabled for browser-related activities. In another example, automatic scrolling may be automatically disabled when robot 12 executes on a handheld device (e.g., smartphone).

In some embodiments, a further step 116 may formulate a computer-readable specification of the current activity, for instance as XML, and insert it into RPA script 40. A flag or any other kind of coding device may indicate whether automatic scrolling is enabled for the respective activity. In some embodiments, step 116 may include formulating a set of instructions for RPA robot 12, said instructions selected according to the respective type of target RPA application 34, user interface, and/or content. Such embodiments rely on the observation that algorithms for automatic scrolling may differ among various RPA target applications, hardware platforms, and types of content. For instance, UI attributes indicative of whether a specific container is currently scrollable may differ from one type of UI to the next (more details on such attributes are given below). In such embodiments, RPA design application 30 may automatically select a scrolling strategy/algorithm that is suitable for the respective target UI and target document, and insert it into the robot specification (e.g., RPA script 40). In other embodiments, robot 12 includes the capability to automatically scroll multiple UIs and/or document types, so the decision to use one algorithm or one set of criteria over another is taken by robot 12 at runtime.

If workflow 66 is not yet complete, RPA design application 30 may return to step 106 described above. Otherwise, a step 120 may output RPA script 40 comprising a specification of robot 12. Script 40 may then be transmitted to a script repository (for instance RPA database 18 in FIG. 1) and/or distributed to RPA hosts.

Figure 14:
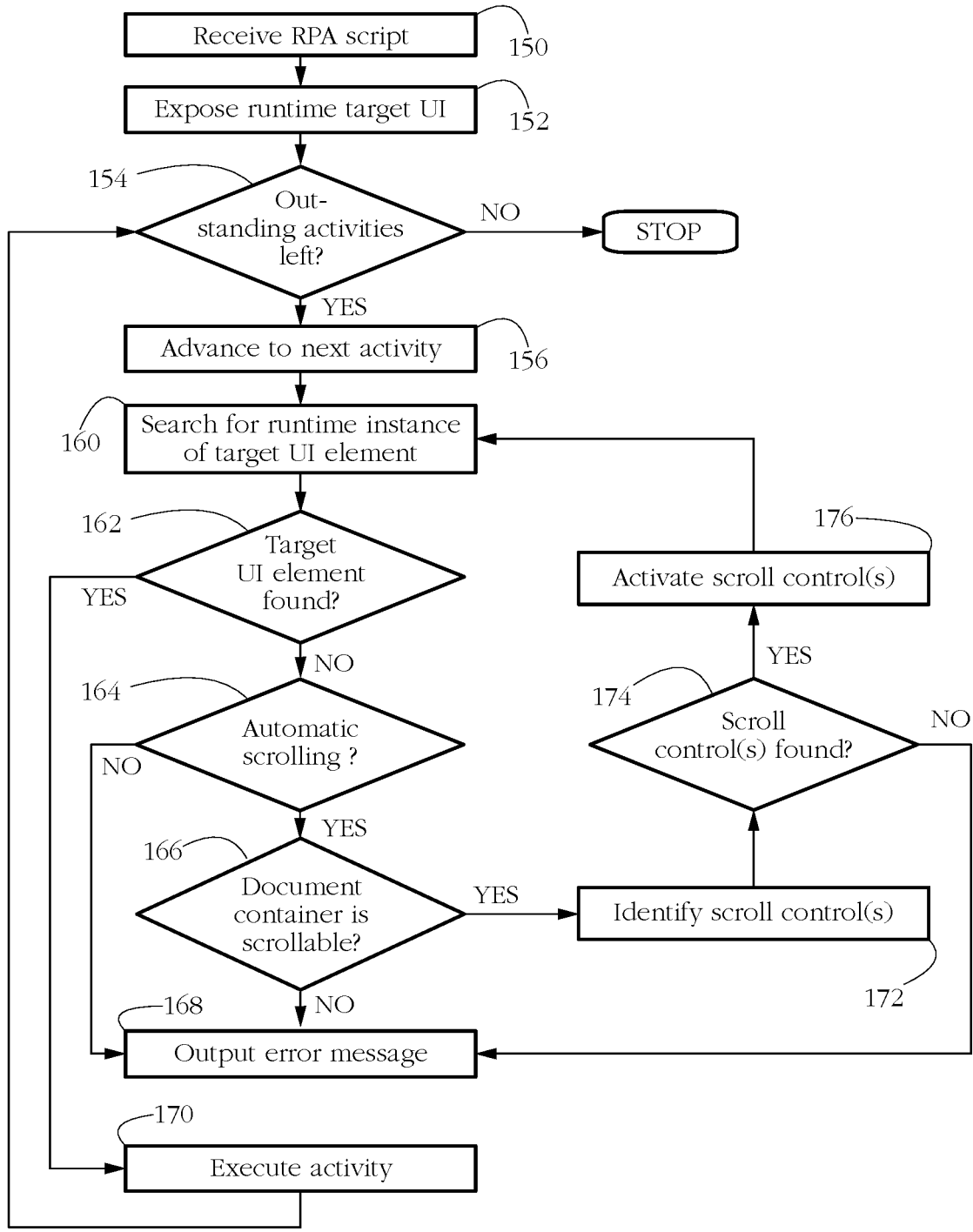
FIG. 14 shows an exemplary sequence of steps performed by an RPA robot at runtime according to some embodiments of the present invention.

FIG. 14 shows an exemplary sequence of steps performed by robot 12 at runtime, according to some embodiments of the present invention. In response to receiving RPA script 40 comprising the specifications of the desired workflow, some embodiments expose a runtime instance of the target UI. A step 152 may instantiate a target application such as Microsoft Excel on the respective RPA host. In another example, step 152 may comprise remotely accessing a document via a local instance of a web browser.

Next, for each activity of the respective workflow, a sequence beginning with a step 160 may search for a runtime instance of the target/operand of the respective activity. When the target document does not fit in its entirety within its intended container, searching for the runtime target may involve automatic scrolling, as describe in detail below. In such embodiments, the runtime UI may display an initial part of the respective document. Robot 12 may then automatically activate a scroll control, thereby causing the runtime UI to display a subsequent part of the document. The term 'initial part' herein denotes any part of the respective document, i.e., not necessarily a first, topmost, or introductory part. For instance, the initial part may refer to the part of the document currently displayed at the beginning of the respective robotic activity. The term 'subsequent part' generically denotes any other part of the respective document made visible in response to scrolling.

In some embodiments, step 160 comprises looking for a candidate UI element within the content currently displayed by the runtime UI, the candidate at least partially matching the characteristics of the target defined at design time. Some embodiments identify the target UI according to a selector/element ID of the target and/or possibly according to other information such as an image of the target, or according to other UI elements displayed in the vicinity of the target (sometimes known as anchors). Details of the searching algorithm go beyond the scope of the present description; a skilled artisan will appreciate that step 160 may include any method known in the art.

A step 162 may determine whether step 160 succeeded in identifying the runtime target. When yes, in a step 170 robot 12 may execute the respective RPA activity, for instance read the contents of target spreadsheet cell, fill in a target form field, click a target button, etc. However, the attempt to identify the runtime target may fail for various reasons, for instance because the runtime target is not currently visible within the respective interface. This situation may arise when manipulating large documents wherein the target UI can only display a part of the respective document at any time. When step 160 has failed to identify the target UI element, in a step 164 robot 12 may determine whether automatic scrolling is enabled for the current activity. In some embodiments, a flag associated with the current activity may indicate whether automatic scrolling is enabled. The flag may be set to 'ON' at design time, in response to the robot designer activating a dedicated control (e.g., check box) exposed by RPA design application 30 (see e.g., control 76 in FIG. 13 and associated description above). In alternative embodiments, robot 12 may determine whether automatic scrolling is enabled according to a type of the current activity, according to a type of target UI element, etc.

In some embodiments, when the search for the runtime target has failed and automatic scrolling is off, in a step 168 robot 12 may suspend execution and output an error message communicating that the robot could not carry out the current activity and/or that the runtime target could not be identified.

When automatic scrolling is enabled, a step 166 may determine whether the UI container displaying the target document is scrollable, for instance according to the current value of specific attributes of the respective container and/or of the target UI. Most UIs have such scrolling-indicative attributes that show, for instance, whether a specific window of the respective UI currently displays scroll bars or not, whether a browser instance is currently configured to fetch new content in response to a user's scrolling to the bottom of the page, etc. The respective attributes may differ from one type of UI and/or from one type of target RPA application to the next, so step 166 may comprise looking up current values of a set of application-specific attributes.

In one such example, the current value (true/false) of the growing attribute of a member of the sap.m.Table or sap.m.List classes of the SAP Fiori® framework indicates whether the respective container is currently configured to load more items in response to a user scrolling to the last item of a current list or table. A value of true may therefore indicate that the respective container is scrollable. Other exemplary scroll-indicative attributes from the same framework include firstVisibleRow and visibleRowCount, which may be used to determine whether all the rows of a table are currently displayed or not, or stated otherwise, whether the respective content is scrollable. In another example, a current value of the isFolderExpandable attribute of an element belonging to the GuiTree class of an SAP WinGUI® user interface indicates whether the respective node is expandable or not (see e.g., node 52c in FIG. 10). Meanwhile, the current value of the isFolderExpanded attribute shows whether the respective node is currently in an expanded state (see e.g., node 52a in FIG. 10).

In alternative embodiments, robot 12 may use other means to determine whether the respective container and/or target UI currently comprise a scroll control. When yes, step 166 may conclude that the respective container/UI is scrollable. When step 166 returns a no, robot 12 may output an error message (step 168).

A further step 172 may identify at least one scroll control actionable to scroll the contents of the respective UI container. Some embodiments rely on the observation that the types of scroll control exposed by a user interface may be specific to the type of the respective UI or to the type of the respective target application 34. For instance, an e-book reader interface may have scroll controls as illustrated in FIG. 9 but may lack scroll bars. Furthermore, a spreadsheet application may not use node-expanding scroll controls as illustrated in FIG. 10. The type of scroll controls may even differ between distinct members of the same category of applications, for instance between different web browsers. In view of the above, in some embodiments step 172 may comprise searching for scroll controls of a kind selected according to a type of RPA target application.

The actual strategy of searching for scroll controls may vary. In some embodiments, robot 12 may identify a scroll control according to a current value of a scrolling-indicative attribute of the respective UI container. For instance, in interfaces implemented according to the SAP Fiori® framework, the current value of the growingTriggerText attribute gives the text currently displayed on a button which, when clicked, scrolls through a list of items. Some embodiments may search for a button displaying the respective text, and identify the respective button as a scroll control for the respective container.

Other embodiments select a candidate UI element from the runtime UI and determine whether the candidate UI element could be a scroll control. Candidate UI elements may be selected or filtered according to various criteria, for instance according to whether they are responsive (i.e., whether they have an associated behavior or response when acted upon) and/or according to a position of the respective control within the respective UI or container. In a web browsing interface, exemplary criteria for identifying scroll controls comprise whether the candidate UI element comprises a hyperlink, whether the candidate UI element is located within a particular region of the interface (e.g., near the bottom, close to the lateral edges, etc.), and whether the candidate UI element forms a part of a particular section of the displayed document (e.g. header, footer, menu, crumb etc.). Yet other criteria may include a visual appearance of the candidate UI element, for instance, the shape (e.g., whether the candidate UI element looks like an arrow), and a text displayed by the candidate UI element. Some embodiments may attempt to match the text displayed by the candidate UI element against a dictionary of common labels displayed by scroll controls (e.g., 'More', 'Next', 'Previous', 'Forward', etc.).

In some embodiments, robot 12 may employ artificial intelligence technology to determine whether a container is scrollable and/or to identify scroll controls exposed by the runtime UI. Such approaches may be particularly suited to web interfaces, which are known to have highly diverse scroll controls. Some embodiments may pre-train a set of artificial neural networks on a corpus of images of scrollable and/or non-scrollable user interfaces, and deploy the trained neural networks to automatically identify scroll controls such as items 55*c-d-e* in FIG. 8. Robot 12 may take a snapshot of a region of a screen that displays at least a part of the runtime UI, and use image segmentation algorithms to identify areas of the respective image that may show scroll controls. Segmented images may then be fed to a set of trained neural networks, which may return a set of scroll control candidates. In embodiments wherein step 172 relies on image analysis, step 172 may further comprise robot 12 employing driver(s) 36 to automatically move a cursor to a particular region of the target UI to force the respective UI to reveal currently hidden scroll controls.

When step 172 could not identify any scroll controls (step 174 returns a no), some embodiments may advance to step 168 and issue an error message. When step 172 has successfully identified at least one scroll control exposed by the target UI, in a step 176 robot 12 may employ driver(s) 36 to automatically activate the identified scroll control, thus causing the target UI to display a subsequent part of the respective document. Step 176 may comprise mimicking a user action such as executing a hand gesture on a touchscreen (e.g., swiping), dragging a scrollbar (e.g., items 55*a-b* in FIG. 7), clicking on a hyperlink (e.g., item 55*e* in FIG. 8), pressing an arrow button on a keyboard, etc. In response to the target UI revealing a subsequent part of the displayed document, robot 12 may return to step 160 described above, to perform another attempt to identify the runtime target of the current activity.

FIG. 14 illustrates an embodiment of the present invention configured to automatically scroll a document until either the runtime target is found, or no more scrolling is possible. Stated otherwise, in FIG. 14 automatic scrolling ends when a single instance of the target element is identified. An alternative embodiment may address another problem which often arises in automating interaction with large documents, namely identifying multiple instances of an item matching certain criteria. In one exemplary use case scenario comprising processing a sales spreadsheet, the robot must find all products in a pre-determined category (e.g., mobile phones), all transactions performed within a pre-determined time period (e.g., previous month), etc. In some embodiments, robot 12 may search for the respective items within an initial part of the spreadsheet, and then attempt to scroll (e.g., sequence of steps 164-166-172-174-176 in FIG. 14) to continue searching within subsequent parts of the spreadsheet, until the respective content is not scrollable anymore. The current RPA activity may thus be applied to all items matching the search criteria.

Figure 15:
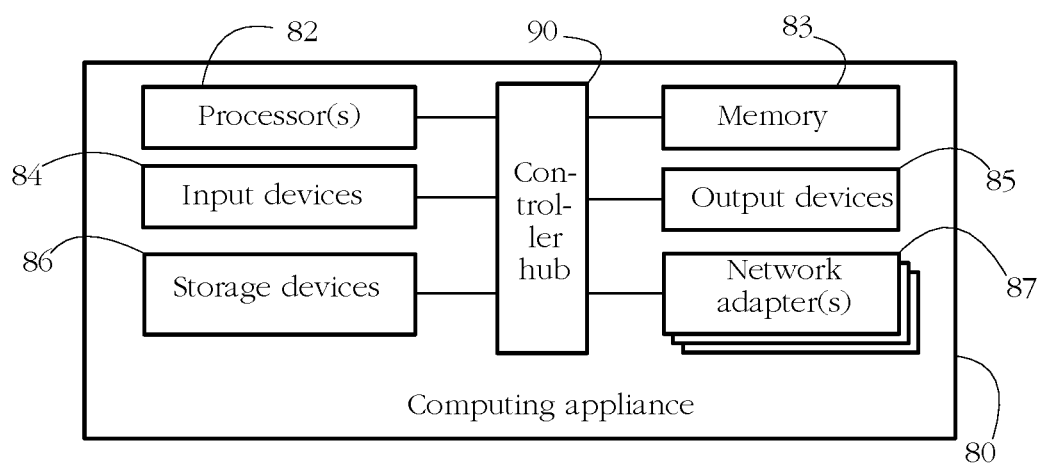
FIG. 15 shows an exemplary hardware configuration of a computing appliance programmed to execute some of the methods described herein.

FIG. 15 shows an exemplary hardware configuration of a computing appliance 80 programmed to execute some of the methods described herein. Appliance 80 may represent any of RPA host platforms 20*a-e* in FIG. 3. The illustrated appliance is a personal computer; other computing devices such as servers, mobile telephones, tablet computers, and wearable computing devices may have slightly different configurations. Processor(s) 82 comprise a physical device (e.g. microprocessor, multi-core integrated circuit formed on a semiconductor substrate) configured to execute computational and/or logical operations with a set of signals and/or data. Such signals or data may be encoded and delivered to processor(s) 82 in the form of processor instructions, e.g., machine code. Processor(s) 82 may include a central processing unit (CPU) and/or an array of graphics processing units (GPU).

Memory unit 83 may comprise volatile computer-readable media (e.g. dynamic random-access memory—DRAM) storing data and/or instruction encodings accessed or generated by processor(s) 82 in the course of carrying out operations. Input devices 84 may include computer keyboards, mice, trackpads, and microphones, among others, including the respective hardware interfaces and/or adapters allowing a user to introduce data and/or instructions into appliance 80. Output devices 85 may include display devices such as monitors and speakers among others, as well as hardware interfaces/adapters such as graphic cards, enabling the respective computing device to communicate data to a user. In some embodiments, input and output devices 84-85 share a common piece of hardware (e.g., a touch screen). Storage devices 86 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 87 include mechanical, electrical, and signaling circuitry for communicating data over physical links coupled to an electronic communication network (e.g, FIG. 3) and/or to other devices/computer systems. Adapter(s) 87 may be configured to transmit and/or receive data using a variety of communication protocols.

Controller hub 90 generically represents the plurality of system, peripheral, and/or chipset buses, and/or all other circuitry enabling the communication between processor(s) 82 and the rest of the hardware components of appliance 80. For instance, controller hub 90 may comprise a memory controller, an input/output (I/O) controller, and an interrupt controller. Depending on hardware manufacturer, some such controllers may be incorporated into a single integrated circuit, and/or may be integrated with processor(s) 82. In another example, controller hub 90 may comprise a northbridge connecting processor 82 to memory 83, and/or a southbridge connecting processor 82 to devices 84, 85, 86, and 87.

The exemplary systems and methods described above facilitate the design/programming of RPA robots by making such activities more accessible and attractive to less technically inclined developers, or to developers that lack a formal programming background.

Modern robotic process automation sometimes requires working with large documents, such as spreadsheets, lists of emails, images, and complex webpages that do not fit within a UI window all at once. Automating interaction with such documents poses particular technical challenges. For instance, some conventional RPA robots may fail to identify the target of the current RPA activity when the respective UI element is currently not in view. To address such shortcomings, some embodiments of the present invention enable an automatic scroll mechanism wherein the RPA robot searches for the RPA target within the visible portion of the document, and when the search fails, the robot automatically actuates a scroll control of the respective user interface to cause it to bring a subsequent part of the respective document into view. The robot may then continue searching for the RPA target within the newly revealed part of the document. In some embodiments, the RPA robot automatically identifies the scroll control according to a type of target application (e.g., Microsoft Excel®, SAP®, web browser, etc.).

Some conventional RPA robots may be configured to perform scrolling activities. However, in conventional RPA, the robot developer explicitly instructs the robot to scroll and/or explicitly indicates a scroll control at design time, so the robot may attempt to find the respective control at runtime like it would with any other UI element. However, designing such robots typically requires a relatively high level of understanding of the inner workings of RPA robots and user interfaces, i.e., a level of skill that is expected to exceed that of a regular RPA developer. In another example of conventional RPA, a robot may record a sequence of activities (which may include scrolling) performed by a human operator, and replay the respective sequence at runtime. However, in such examples, the robot simply finds the same UI elements that the human operator has acted upon at design time. Stated otherwise, any scroll control used by the robot at runtime was indicated at design time by the actions of the human operator.

In contrast to such conventional RPA examples, in some embodiments of the present invention the RPA robot is configured to automatically decide whether to scroll or not, according to whether the sought-after UI element was found or not. The robot may be further configured to automatically determine whether a UI container is scrollable and to autodetect a scroll control, as opposed of looking for a specific scroll control indicated by the developer at design time. Some embodiments are further capable of adapting the scrolling strategy to the type of interface and/or to the type of content, without explicit instruction from a developer. Such technological enhancements may offer a substantial advantage in situations wherein the design and/or content of the target interface has changed between design time and runtime, by making the robot more capable of dealing with situations that were not foreseen at design time. Furthermore, such improvements in RPA technology effectively take the burden of configuring scrolling off the shoulders of the developer, which may substantially facilitate robot development and thus open up such activities to a broader audience including non-technical developers or developers who lack a programming background.

In some embodiments, automatic scrolling may be optionally switched on or off at design time, using a feature of the robot design interface. Such embodiments rely on the observation that automatic scrolling may not be desirable in all situations. For instance, when parsing complex web pages, automatic scrolling may fail for unforeseeable reasons, potentially leading to counter-productive runtime errors and time-consuming debugging. Another exemplary use case where default automatic scrolling may not be desirable comprises an attended robot configured to assist a human operator in carrying out a set of data manipulations. When the robot works side-by-side with the human operator and interacts with the same user interface(s), automatic scrolling may accidentally interfere with and obstruct the work of the human operator.

In yet another example wherein automatic scrolling may not be desirable, a sequence of activities may read data from various columns of the same table row. For instance, a first RPA activity may automatically find a customer record according to the respective customer's telephone number. A second RPA activity may then read the respective customer's name, while a third RPA activity may read the respective customer's delivery address. Having all three successive RPA activities use automatic scrolling may be impractical, since successfully performing the first activity brings the respective customer record (e.g., table row) into view, so the target of the second and third activities is already visible within the UI. A better RPA strategy may therefore comprise enabling automatic scrolling for the first RPA activity and disabling it for the second and third RPA activities.

In view of such situations, some embodiments give the developer the option of whether to enable automatic scrolling or not, with the granularity of individual activities. In some embodiments, automatic scrolling may be selectively enabled depending on the target document, type of RPA target application, and/or type of RPA activity.

It will be clear to one skilled in the art that the above embodiments may be altered in many ways without departing from the scope of the invention. Accordingly, the scope of the invention should be determined by the following claims and their legal equivalents.

What is claimed is:

1. A method comprising employing at least one hardware processor of a computer system to expose a robotic process automation (RPA) robot design interface to a user, the robot design interface configured to:
   receive a user input indicating a target element of a user interface (UI) displaying an electronic document, the user input further indicating an RPA activity to be performed on the target element;
   display a control enabling the user to indicate whether an automatic scroll option is active; and
   output an RPA script including an indicator of whether the automatic scroll option is active, wherein executing the RPA script causes an RPA robot to:
      perform an attempt to identify a runtime instance of the target element within a runtime instance of the UI, the runtime instance of the UI currently displaying an initial part of the electronic document;
      in response to the attempt failing, determine according to the RPA script whether the automatic scroll option is active;
      in response to determining that the automatic scroll option is active, activate a scroll control of the runtime instance of the UI to cause a display of a subsequent part of the electronic document;
      in response to activating the scroll control, perform another attempt to identify the runtime instance of the target element within the subsequent part of the electronic document; and
      in response to a successful identification of the runtime instance of the target element, carry out the RPA activity on the runtime instance of the target element.

2. The method of claim 1, wherein executing the RPA script further causes the RPA robot to automatically identify the scroll control according to a type of application exposing the runtime instance of the UI.

3. The method of claim 1, wherein executing the RPA script further causes the RPA robot to automatically identify the scroll control, and wherein identifying the scroll control comprises:
   selecting a candidate UI element from the runtime instance of the UI according to whether the candidate UI element is responsive; and
   determining whether the candidate UI element comprises the scroll control.

4. The method of claim 1, wherein the electronic document comprises an item selected from a group consisting of a spreadsheet, a webpage, and a list of email messages.

5. The method of claim 1, wherein the electronic document includes a hierarchical structure comprising a plurality of nodes, and wherein activating the scroll control causes the runtime instance of the UI to expand a selected node of the plurality of nodes into a set of sub-nodes.

6. The method of claim 1, further comprising employing the at least one hardware processor to identify the scroll control according to a snapshot of at least one region of the runtime UI.

7. A computer system comprising at least one hardware processor configured to expose a robotic process automation (RPA) robot design interface to a user, the robot design interface configured to:
   receive a user input indicating a target element of a user interface (UI) displaying an electronic document, the user input further indicating an RPA activity to be performed on the target element;
   display a control enabling the user to indicate whether an automatic scroll option is active; and
   output an RPA script including an indicator of whether the automatic scroll option is active, wherein executing the RPA script causes an RPA robot to:
      perform an attempt to identify a runtime instance of the target element within a runtime instance of the UI, the runtime instance of the UI currently displaying an initial part of the electronic document;
      if the attempt fails, determine according to the RPA script whether the automatic scroll option is active;
      in response to determining that the automatic scroll option is active, activate a scroll control of the runtime instance of the UI to cause a display of a subsequent part of the electronic document;
      in response to activating the scroll control, perform another attempt to identify the runtime instance of the target element within the subsequent part of the electronic document; and
      in response to a successful identification of the runtime instance of the target element, carry out the RPA activity on the runtime instance of the target element.

8. The computer system of claim 7, wherein executing the RPA script further causes the RPA robot to automatically identify the scroll control according to a type of application exposing the runtime instance of the UI.

9. The computer system of claim 7, wherein executing the RPA script further causes the RPA robot to automatically identify the scroll control, and wherein identifying the scroll control comprises:
   selecting a candidate UI element from the runtime instance of the UI according to whether the candidate UI element is responsive; and
   determining whether the candidate UI element comprises the scroll control.

10. The computer system of claim 7, wherein the electronic document comprises an item selected from a group consisting of a spreadsheet, a webpage, and a list of email messages.

11. The computer system of claim 7, wherein the electronic document includes a hierarchical structure comprising a plurality of nodes, and wherein activating the scroll control causes the runtime instance of the UI to expand a selected node of the plurality of nodes into a set of sub-nodes.

12. The computer system of claim 7, wherein the at least one hardware processor is further configured to identify the scroll control according to a snapshot of at least one region of the runtime UI.

13. A non-transitory computer-readable medium storing instructions which, when executed by at least one hardware processor of a computer system, cause the computer system to expose a robotic process automation (RPA) robot design interface to a user, the robot design interface configured to:
   receive a user input indicating a target element of a user interface (UI) displaying an electronic document, the user input further indicating an RPA activity to be performed on the target element;
   display a control enabling the user to indicate whether an automatic scroll option is active; and
   output an RPA script including an indicator of whether the automatic scroll option is active, wherein executing the RPA script causes an RPA robot to:
      perform an attempt to identify a runtime instance of the target element within a runtime instance of the UI, the runtime instance of the UI currently displaying an initial part of the electronic document;
      if the attempt fails, determine according to the RPA script whether the automatic scroll option is active;
      in response to determining that the automatic scroll option is active, activate a scroll control of the runtime instance of the UI to cause a display of a subsequent part of the electronic document;
      in response to activating the scroll control, perform another attempt to identify the runtime instance of the target element within the subsequent part of the electronic document; and
      in response to a successful identification of the runtime instance of the target element, carry out the RPA activity on the runtime instance of the target element.

14. The method of claim 1, wherein the RPA script comprises a specification of a sequence of RPA activities to be carried out by the RPA robot, the sequence including the indicated RPA activity, and wherein the robot design interface enables the user to indicate whether the automatic scroll option is active independently for each RPA activity of the sequence.

15. The computer system of claim 7, wherein the RPA script comprises a specification of a sequence of RPA activities to be carried out by the RPA robot, the sequence including the indicated RPA activity, and wherein the robot design interface enables the user to indicate whether the automatic scroll option is active independently for each RPA activity of the sequence.

16. The method of claim 1, wherein executing the RPA script causes the RPA robot, in preparation for activating the scroll control, to determine whether to activate the scroll control according to a type of the electronic document.

17. The computer system of claim 7, wherein executing the RPA script causes the RPA robot, in preparation for activating the scroll control, to determine whether to activate the scroll control according to a type of the electronic document.

18. The method of claim 16, wherein executing the RPA script causes the RPA robot to not activate the scroll control if the electronic document is a webpage.

19. The computer system of claim 17, wherein executing the RPA script causes the RPA robot to not activate the scroll control if the electronic document is a webpage.

20. The method of claim 1, wherein executing the RPA script causes the RPA robot, in preparation for activating the scroll control, to determine whether to activate the scroll control according to a device type of an RPA host executing the RPA robot.

21. The computer system of claim 7, wherein executing the RPA script causes the RPA robot, in preparation for activating the scroll control, to determine whether to activate the scroll control according to a device type of an RPA host executing the RPA robot.

* * * * *